(12) United States Patent
Shah et al.

(10) Patent No.: US 11,829,950 B2
(45) Date of Patent: Nov. 28, 2023

(54) FINANCIAL DOCUMENTS EXAMINATION METHODS AND SYSTEMS

(71) Applicant: Sentieo, Inc., New York, NY (US)

(72) Inventors: Naman Shah, Indian Harbor Beach, FL (US); Atul Shah, Indian Harbor Beach, FL (US); Anurag Saxena, New Delhi (IN); Jed Gore, Greenwich, CT (US); Jitender Khatri, Punjab Khore Delhi (IN); Vaibhav Negi, Delhi (IN); Rajdeep Singh Gill, New Delhi (IN)

(73) Assignee: Sentieo, Inc., New York, NY (US)

( * ) Notice: Subject to any disclaimer, the term of this patent is extended or adjusted under 35 U.S.C. 154(b) by 0 days.

(21) Appl. No.: 18/059,588

(22) Filed: Nov. 29, 2022

(65) Prior Publication Data
US 2023/0087987 A1    Mar. 23, 2023

Related U.S. Application Data

(63) Continuation of application No. 17/837,526, filed on Jun. 10, 2022, which is a continuation of application No. 15/729,645, filed on Oct. 10, 2017, now abandoned.

(60) Provisional application No. 62/405,828, filed on Oct. 7, 2016.

(51) Int. Cl.
| | |
|---|---|
| G06Q 10/10 | (2023.01) |
| G06Q 40/02 | (2023.01) |
| G06Q 40/12 | (2023.01) |
| G06F 40/242 | (2020.01) |
| G06F 16/31 | (2019.01) |
| G06F 40/205 | (2020.01) |
| G06F 16/93 | (2019.01) |

(52) U.S. Cl.
CPC ............ *G06Q 10/10* (2013.01); *G06F 16/316* (2019.01); *G06F 16/93* (2019.01); *G06F 40/205* (2020.01); *G06F 40/242* (2020.01); *G06Q 40/02* (2013.01); *G06Q 40/12* (2013.12)

(58) Field of Classification Search
CPC ...... G06Q 40/10; G06Q 40/12; G06F 40/242; G06F 16/316; G06F 40/205; G06F 16/93
USPC .......................................................... 705/30
See application file for complete search history.

(56) References Cited

U.S. PATENT DOCUMENTS

| | | | |
|---|---|---|---|
| 5,893,131 A | 4/1999 | Kornfeld | |
| 6,026,409 A * | 2/2000 | Blumenthal | .......... G06F 16/338 345/589 |
| 6,336,094 B1 | 1/2002 | Ferguson et al. | |

(Continued)

OTHER PUBLICATIONS

USPTO, Non-Final Office Action for corresponding U.S. Appl. No. 15/729,645, dated Aug. 24, 2020, 8 pages.

*Primary Examiner* — Andrew Joseph Rudy
(74) *Attorney, Agent, or Firm* — NK Patent Law

(57) ABSTRACT

A user is able to extract financial data, particularly tables, from a document. The table is stored and the user can compare the data in this table with data from similar tables from previous documents. The user can see how financial data has changed historically by looking only at financial tables from the same type of document, for example, only balance sheet tables from annual reports for a specific public company, over many years, and see how the values have changed or whether any new categories or types of data have been added or deleted. From the time series of financial data, the user can gain real intelligence into an entity's financial health.

18 Claims, 13 Drawing Sheets

(56) References Cited

U.S. PATENT DOCUMENTS

| | | | |
|---|---|---|---|
| 6,718,336 B1 * | 4/2004 | Saffer | G06F 16/25 707/999.102 |
| 6,782,400 B2 | 8/2004 | Geuss et al. | |
| 6,850,950 B1 | 2/2005 | Clarke et al. | |
| 7,231,593 B1 | 6/2007 | Raja et al. | |
| 7,590,647 B2 * | 9/2009 | Srinivasan | G06F 16/86 715/708 |
| 7,653,871 B2 | 1/2010 | LaComb et al. | |
| 7,856,388 B1 | 12/2010 | Srivastava et al. | |
| 7,880,909 B2 | 2/2011 | Bukowski et al. | |
| 8,225,217 B2 * | 7/2012 | Allor | G06F 40/143 715/764 |
| 8,443,012 B2 * | 5/2013 | VanderDrift | G06F 16/88 707/705 |
| 8,600,845 B2 | 12/2013 | Lobana et al. | |
| 9,619,448 B2 * | 4/2017 | Fischer | G06F 16/93 |
| 9,965,809 B2 | 5/2018 | Dejean | |
| 10,095,672 B2 | 10/2018 | Theis et al. | |
| 10,223,337 B2 * | 3/2019 | Davis | G06F 3/04842 |

\* cited by examiner

Time Series Function

Watch this video to get started.

Step 2 of 2.

☑ Selected                                            ☑ ☑ ☑ ☑

|  | | Three months ended June 34, | | Six months ended June 30, | |
|---|---|---|---|---|---|
|  | | 2016 | 2015 | 2016 | 2015 |
| ☑ | Beginning of period | 2,345 | 1,234 | 2,345 | 1,234 |
| ☑ | Openings | 38 | 48 | 116 | 97 |
| ☑ | Back entries | ... | (1) | (2) | (2) |
| ☑ | Total at end of period | 2,124 | 1,878 | 2,124 | 1,878 |

Cancel    Submit

| | Three months ended June 30, | | Six months ended June 30, | |
|---|---|---|---|---|
| | 2016 | 2015 | 2016 | 2015 |
| Beginning of period | 2,345 | 1,234 | 2,345 | 1,234 |
| Openings | 38 | 48 | 116 | 97 |
| Relocations | ... | (1) | (2) | (2) |
| Total at end of period | 2,124 | 1,878 | 2,124 | 1,878 |

Average Rate Per Contract (RPC)
CME Group RPC

| 17 | Export Table to Excel | Highlight Table | Table Explorer | ... |

| Product Line | 4Q 2017 | 1Q 2018 | 2Q 2018 | 3Q 2018 | 4Q 2018 |
|---|---|---|---|---|---|
| Interest rates | $ 0.467 | $ 0.464 | $ 0.491 | $ 0.493 | $ 0.475 |
| Equity Indexes | 0.768 | 0.781 | 0.797 | 0.761 | 0.715 |
| Foreign Exchange | 0.765 | 0.762 | 0.741 | 0.743 | 0.720 |
| Energy | 1.133 | 1.140 | 1.142 | 1.187 | 1.150 |
| Agricultural Commodities | 1.251 | 1.264 | 1.274 | 1.286 | 1.261 |
| Metals | 1.315 | 1.367 | 1.403 | 1.379 | 1.428 |
| Average RPC | $ 0.736 | $ 0.706 | $ 0.757 | $ 0.753 | $ 0.689 |

*FIG. 6*

Stitched/Melted Tables

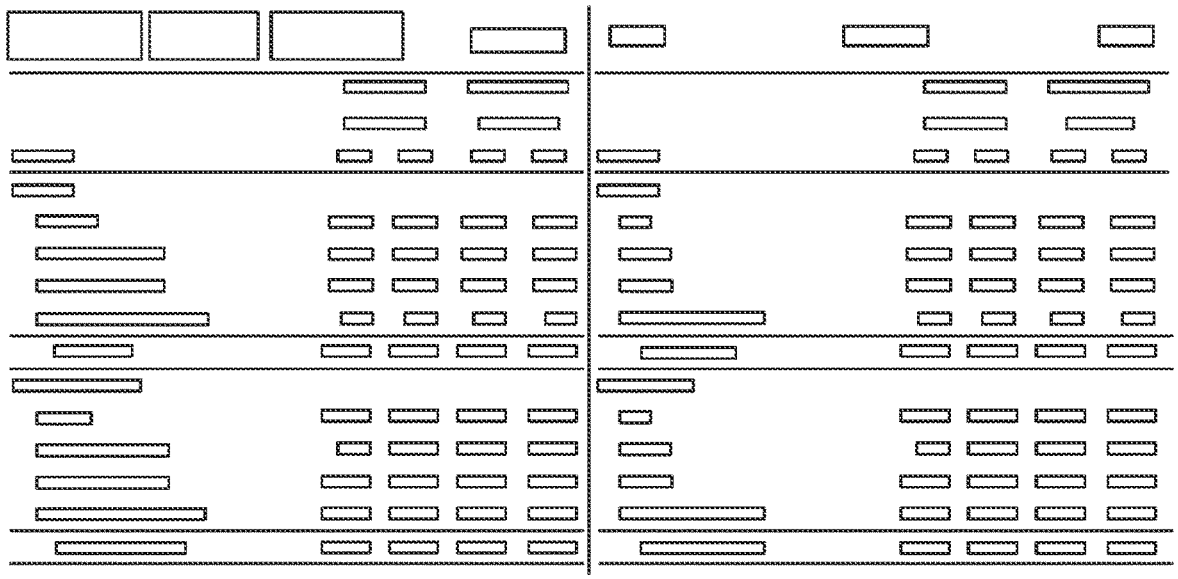

Output

| Terms | Q1 2014 | Q2 2014 | Q3 2014 | Q1 2015 | Q2 2015 | Q3 2015 | Q4 2015 | Q1 2016 | Q2 2016 |
|---|---|---|---|---|---|---|---|---|---|
| Revenues | | | | | | | | | |
| U.S. | 2054.1 | 2,249.8 | 2,202.1 | 1,978.1 | 2,174.2 | 2,189.3 | 4,158 | 2,019.9 | 2,122.8 |
| International Lead Markets | | | | | | 1,971.6 | 4,798 | 1,728.5 | 1,842.8 |
| High Growth Markets | | | | | | 1,645.2 | 8,442 | 1,442.2 | 1,550.5 |
| Foundational Markets & Corp | | | | | | 809.0 | 2,050 | 713.3 | 748.8 |
| Total Revenues | 6,700.3 | 7,181.7 | 6,987.1 | 5,958.9 | 6,497.7 | 6,615.1 | 16,488 | 5,903.9 | 6,265.6 |
| Operating Income | | | | | | | | | |
| U.S. | 820.8 | 980.5 | 914.4 | 731.8 | 925.8 | 902.1 | 4,361 | 840.2 | 1,018.9 |
| International Lead Markets | | | | | | 729.5 | 2,817 | 654.2 | 718.9 |
| High Growth Markets | | | | | | 297.3 | 731 | 220.9 | 273.7 |
| Foundational Markets & Corp | | | | | | 91.4 | 1,016 | 65.0 | (153.6) |
| Total Operating Income | 1,936.0 | 2,189.0 | 2,072.5 | 1,385.5 | 1,849.3 | 2,090.3 | 8,926 | 1,780.3 | 1,837.9 |
| | | | | | | | | | |
| Revenues | | | | | | | | | |
| Europe | 2,712.2 | 2,913.3 | 2,884.1 | 2,164.2 | 2,412.6 | | | | |
| Apmea | 1,618.8 | 1,664.3 | 1530.5 | 1,524.7 | 1,574.0 | | | | |
| Other Countries and Corp | 315.2 | 355.1 | 370.4 | 291.9 | 338.9 | | | | |
| Operating Income | | | | | | | | | |
| Europe | 752.5 | 853.6 | 926.2 | 600.9 | 685.9 | | | | |
| Apmea | 345.91 | 348.3 | 177.9 | 68.5 | 258.7 | | | | |
| Other Countries and Corp | | 6.6 | 54.0 | (15.7) | (21.1) | | | | |

FINANCIAL DOCUMENTS EXAMINATION METHODS AND SYSTEMS

CROSS-REFERENCE TO RELATED APPLICATIONS

This application is a continuation application of U.S. patent application Ser. No. 17/837,526, filed Jun. 10, 2022, which is a continuation application of U.S. patent application Ser. No. 15/729,645, filed Oct. 10, 2017, which claims priority to U.S. provisional application No. 62/405,828, filed Oct. 7, 2016, which are incorporated herein by reference for all purposes.

BACKGROUND OF THE INVENTION

1. Field of the Invention

The present invention relates to financial software. More specifically, the invention relates to software for analyzing similar financial data from multiple documents over time thereby gaining insights into the financial data.

2. Description of the Related Art

Current financial and corporate document examination software platforms lack efficient and intuitive features for their users, and do not possess the ability to process unstructured financial data into coherent structures. The user experience for many of these tools do not facilitate quick and in-depth analysis of financial and corporate data, particularly in the instance where such data are contained in free form text, or in data tables that are specific to an industry or a single company. Users are therefore prevented from gaining meaningful insights into what the numbers and statements contained in these financial and corporate documents mean. There is, effectively, an "intelligence-gathering" limit that is reached with current tools. What is needed is a platform for facilitating analysis of similar and sometimes unstructured financial data over a period of time so that changes and trends can be easily detected.

BRIEF DESCRIPTION OF THE DRAWINGS

FIG. 2 shows a financial table with a column of marks along the left side for each row and a row of marks at the top of the table;

FIG. 3 is a screenshot showing how auditing modifies the table on the right pane to display a source table from an original document in accordance with one embodiment;

FIG. 6 is a screenshot of one feature of a similar tables tool in accordance with one embodiment;

FIG. 7 is a screenshot of a stitched tables feature in accordance with one embodiment;

SUMMARY OF THE EMBODIMENTS

In one aspect of the invention, a method of extracting financial data from a document and analyzing similar financial data from older documents to enhance understanding of the document is described. A financial document intelligence system receives a document containing unstructured data. Tables in the document are identified and extracted using a parsing engine. Each table is converted to a dictionary. The system then verifies that data in a table is financial data and, once verified, the dictionaries for valid financial data tables are stored. A series of stitched tables, also referred to as a time series, is created for a selected table using a row-based, "next best" matching algorithm. Tables that are similar to the selected table with respect to type and schema are identified and used to create a time series for the selected table. This time series allows users to easily see how certain financial data has changed over time.

DETAILED DESCRIPTION

Example embodiments of methods and systems for examining and analyzing financial and corporate documents are described. These examples and embodiments are provided solely to add context and aid in the understanding of the invention. Thus, it will be apparent to one skilled in the art of software and financial document processing that the present invention may be practiced without some or all of the specific details described herein. In other instances, well-known concepts have not been described in detail in order to avoid unnecessarily obscuring the present invention. Although these embodiments are described in sufficient detail to enable one skilled in the art to practice the invention, these examples, illustrations, and contexts are not limiting, and other embodiments may be used and changes may be made without departing from the spirit and scope of the invention.

Figure 1:
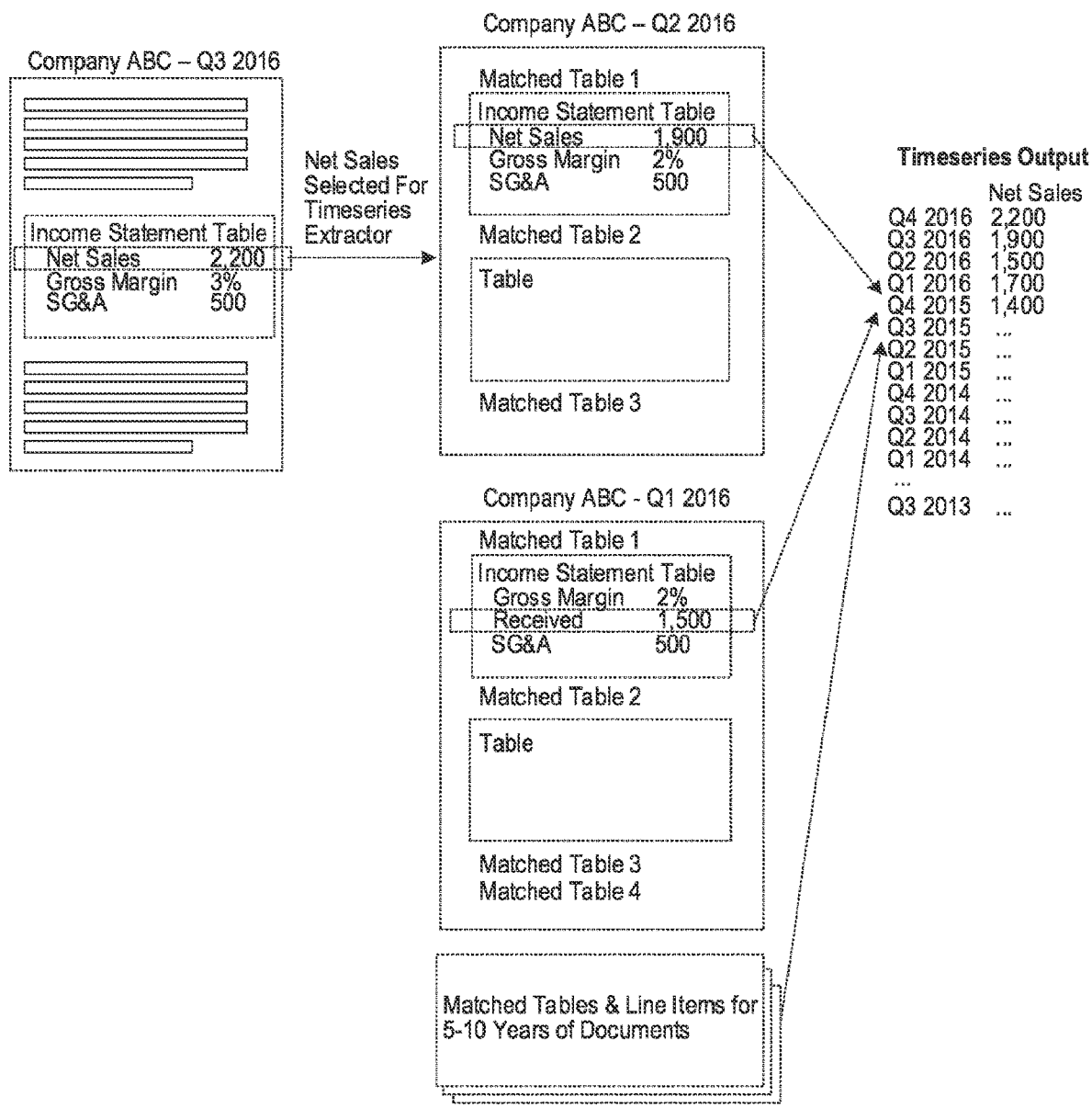
FIG. 1 is a high-level diagram of a time series feature in accordance with one embodiment.

One aspect of the present invention is the ability to perform what is referred to as time series and table extraction. Time series is a function that allows users to select line item rows from a document or HTML/XBRL table and automatically retrieve historical values of those line items from previous documents. A high-level diagram of the time series feature is shown in FIG. 1. The user selects either a specific row from a table to be extracted or the entire table. In one embodiment, the selection of a row can also be done automatically by the software. Logic behind the software finds that particular table in previous versions of the document and extracts those lines and builds what is referred to as a composite table.

The user interface for a time series table allows the user to perform an audit easily by enabling the user to go back to the table from which the highlighted figure originated. In one embodiment, the system can auto-update the composite table whenever a new table is created. Referring now to FIGS. 2 and 3, first FIG. 2 shows a table with a column of marks along the left side for each row and a row of marks at the top of the table. In one embodiment, line items from the original table become columns in the composite table. Each value can be audited by clicking on the table row on the left side of the screen. Referring to FIG. 3, auditing modifies the table on the right pane to display the source table from the original document. The user can also edit the resulting table on the left. The entire table may be exported to a spreadsheet or saved in another suitable format. Additionally, the resulting table can be set to auto-update with new values when new versions of the document are made available.

In one embodiment, the time series and table extraction features are implemented in the following manner. As a financial or other type of document is received in the system, it goes through various preprocessing steps. One of the key stages involves identification of tabular data within the documents. The tabular data is of particular significance as the tables provide a quick structured summary of data mentioned in different places with the document.

In the next step, each table is fed to a parsing engine which creates a text skeleton of the table and divides it into different parts such as headers, data headers, terms and values. For example, the tables in SEC filings are highly non-standardized, consequently the system goes through a number of preprocessing steps to be able to correctly map a term value to its corresponding column value. In case the table contains data for different periods, the value of each term is identified and saved for each period.

This skeleton data of each table is then stored in a database from where it can be quickly fetched on demand. The system may maintain these records for all the historical 10-Qs, 10-Ks, 8-K Earnings, XBRL documents and other SEC filings.

Since the data reported in the filings remain similar from quarter to quarter, the corresponding tables can be identified and matched across the document. The identification logic of the present invention matches the tables on the basis of terms used in the table. Since the order of the tables often varies across documents, and is particularly different in 10-Ks and 10-Qs, the term matching algorithm results in a good match.

As the user opens a document in the platform, the user has an option to use the time series and table extraction functions on each identified table. The table extraction function identifies the most similar table found in each previous document, based on the term matching algorithm, and returns them.

Once the results of a time series extraction are returned, they are presented within a table for the user. The user may click on each value and on the right side of the screen, an auditing pane loads the corresponding table from where the value was pulled and is displayed. Extracted valued are color coded to make identifying them within large tables easy. This allows a user to quickly audit the entire table to ensure the values that our algorithm has produced are correct. If multiple tables were returned for the document/value that the user is auditing, the additional tables are displayed below. The user can easily replace values by clicking in any portion of the table and typing the new value or by selecting other matched values from a dropdown menu in the auditing pane.

Users are normally looking for quarterly values. However, often times values reported within filings are for entire fiscal years or quarter summations of the year to date (3 months, 6 months, 9 months, etc.). Time series allows users to quickly transform these summation values to quarterly values for the entire table by checking specific boxes. If a summation transformation is required only for a single document/value, the user can simply click the YTD box to the left of that value. Once the user is satisfied with the output of the table, they have the option to export the entire table to a spreadsheet. They may also save the output of the time series extraction on the system or open it within a visualization engine, described below.

The time series function allows the user to select a number of terms from the source table. The function identifies the top three similar tables in each previous document (on the basis of the term match algorithm) and then looks for the exact term as the user has requested. If the term is found, that numerical value which corresponds to the latest date in the table is fetched. The output of the time series function is the list of quarter-value pair for the term across documents for the previous five years. The user has an option to load the values for older documents if the user wants the previous data.

A term may not be used in exactly the same way as in the previous table. This could be because the company has changed the nomenclature for the reported term. For example, a company which stated reporting "Total Members" of its service initially may change it to "Total Membership."

For such cases, the system first returns an empty value for the missing quarter. The system then goes back to find the similar tables to the source table in the document corresponding to the missing quarter. The system then finds other terms in these similar tables, which are similar to the term that the user has requested. If a term is matched with a high degree of surety, the system finds the corresponding term value for the latest date in the table and returns it with a warning that the actual term and value may be different.

Figure 4:
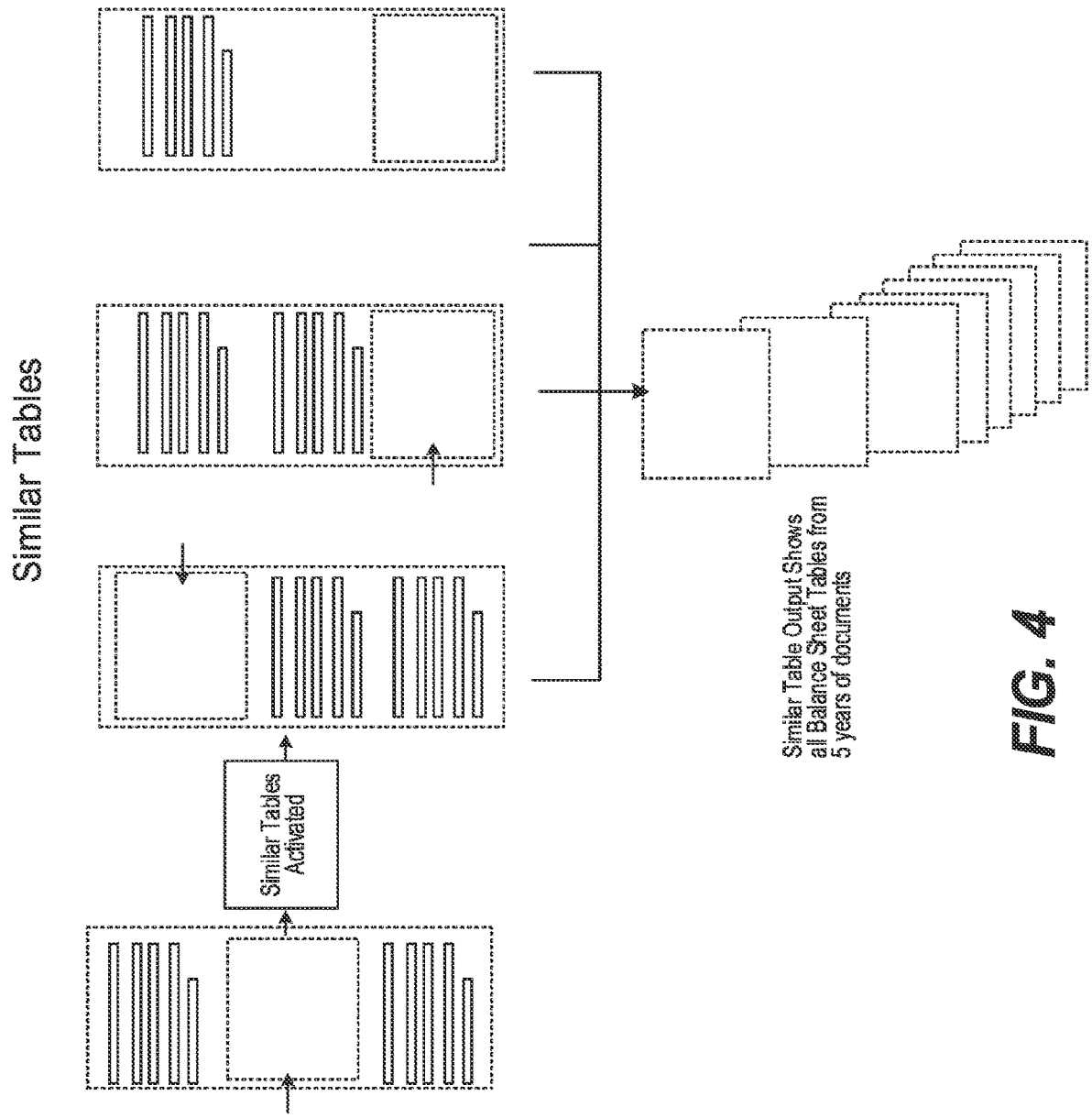
FIG. 4 is a block diagram showing a high-level view of similar tables.
Figure 5:
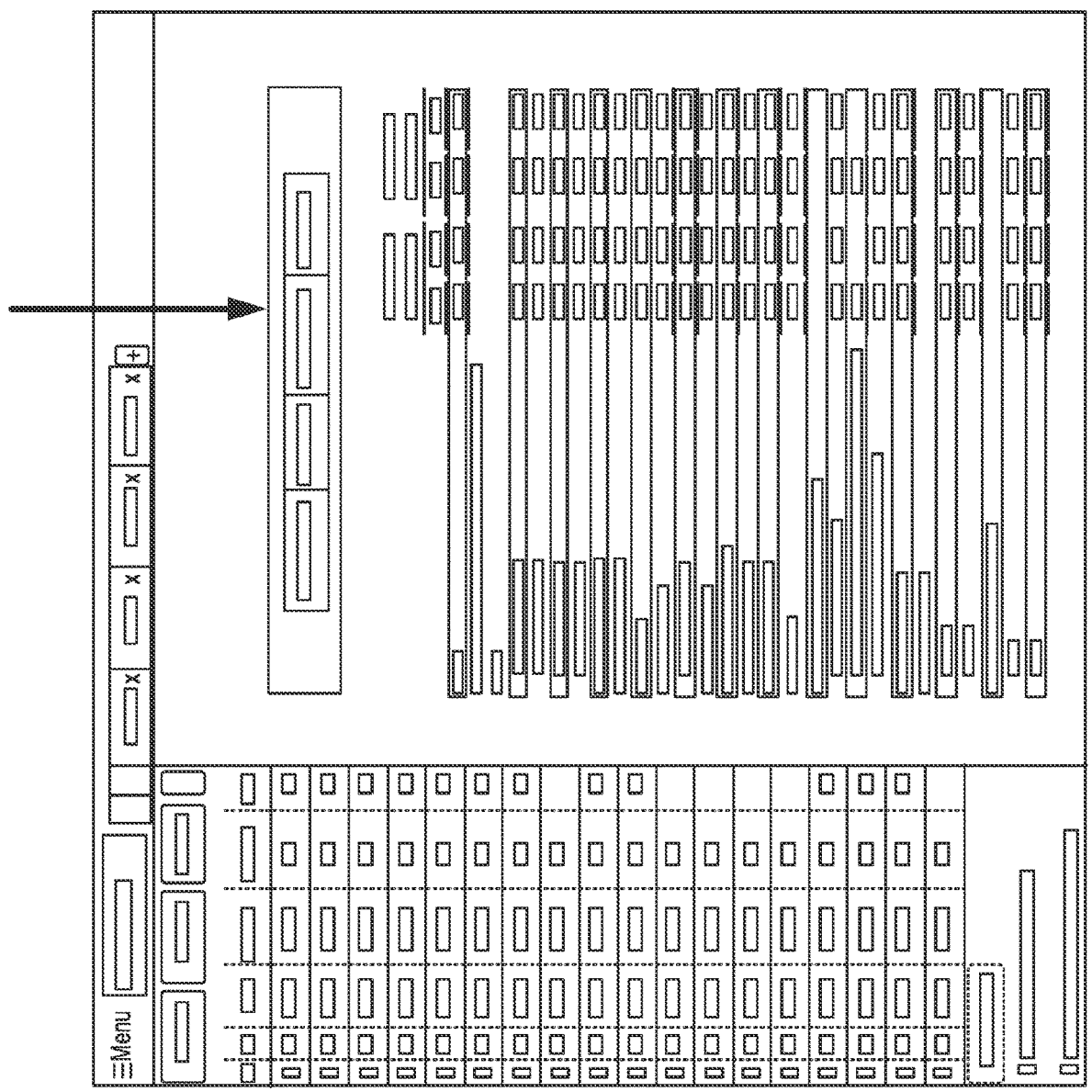
FIG. 5 shows a screenshot when a user clicks Similar Tables in a document and showing tables from five years of quarterly filings and presenting in a split screen view.

The similar tables feature allows a user to click a button above a document table to load up the same table from previous filings. A high-level view of similar tables is shown in FIG. 4. For example, a user may click Similar Tables on the Income Statement table in a company's quarterly filing and the tool automatically fetches the Income Statement table from five years of quarterly filings and presents them to the user in a split screen view. This is shown in FIG. 5.

The similar tables tool identifies these similar, historical tables by applying an algorithm to take the contents of the original table and statistically compare them to the contents of all tables in historical filings of the same type. This is shown in FIG. 6. The table with the highest statistical match is presented as the matched similar table. Once the tool has presented all the similar tables to a user, the user may export the set of tables to a spreadsheet or perform advanced analysis/export through time series, stitched tables and melted tables, features that are described below.

Another feature of the invention is referred to as stitched tables. This tool generalizes the concepts of time series and similar tables extraction to join entire tables processed at once instead of on a line-by-line basis. Line items that do not match are preserved in sequence rather than discarded. Duplicate line items are separately handled. This method has the advantage of being computationally efficient for large volumes of tables. It also has the advantage of handling, in a user-friendly way, constant changes in financial reporting as business needs evolve over time, for example, due to reorganizations, acquisitions, and new/discounted disclosures. An example is shown in FIG. 7.

Figure 8:
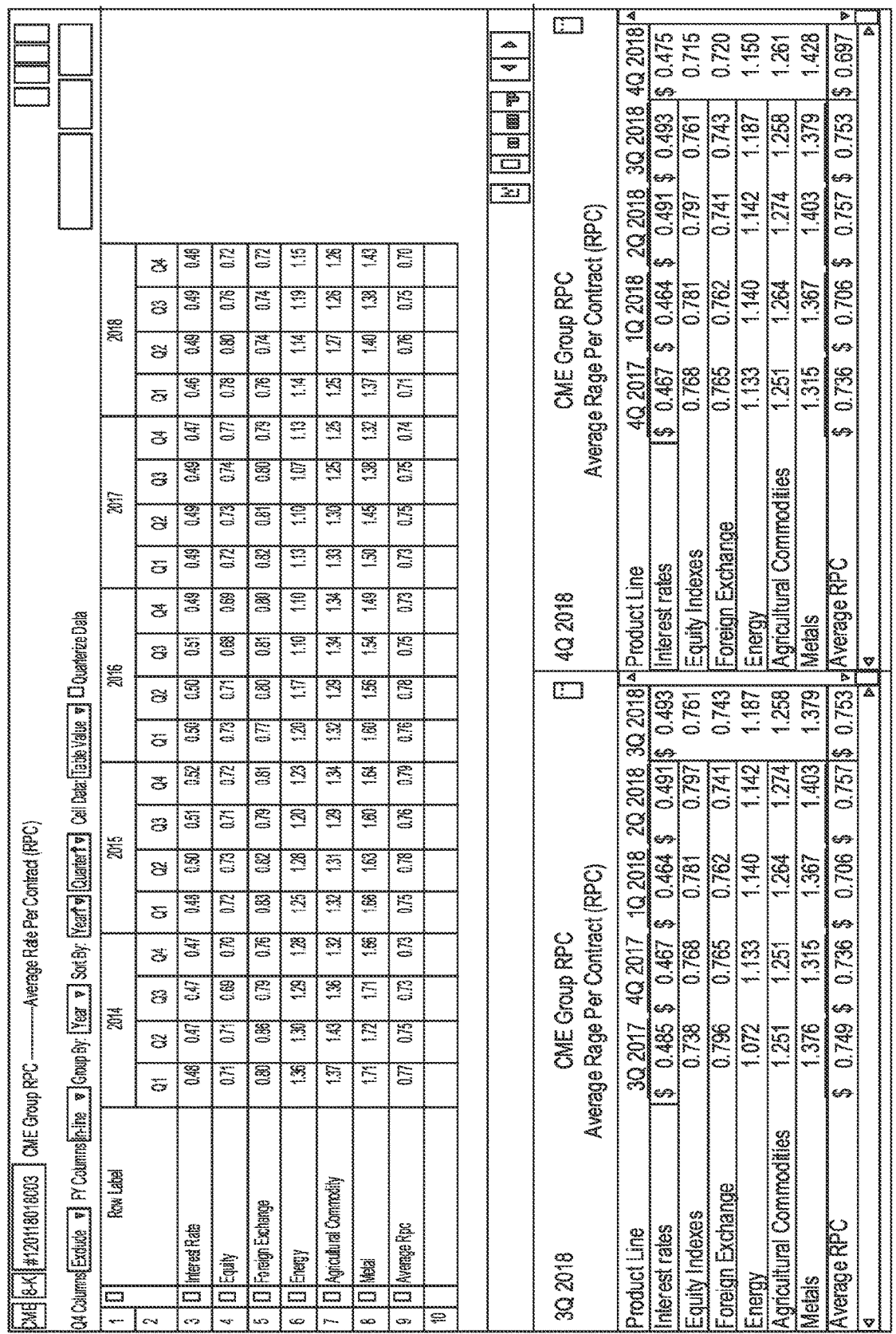
FIG. 8 is a screenshot of a melted tables feature in accordance with one embodiment.

A feature related to stitched tables may be referred to as melted tables. These tables generalize the concept of stitched tables to encompass multi-dimensional tables where time is not represented in a single column but rather is represented by the entire table. Columns are reshaped into rows and stitched together with their corollaries across time. This has particular applications in a variety of modeling contexts, for example, from Debt Maturity Schedules to property-level ownership breakdowns. An example is shown in FIG. 8.

Figure 9:
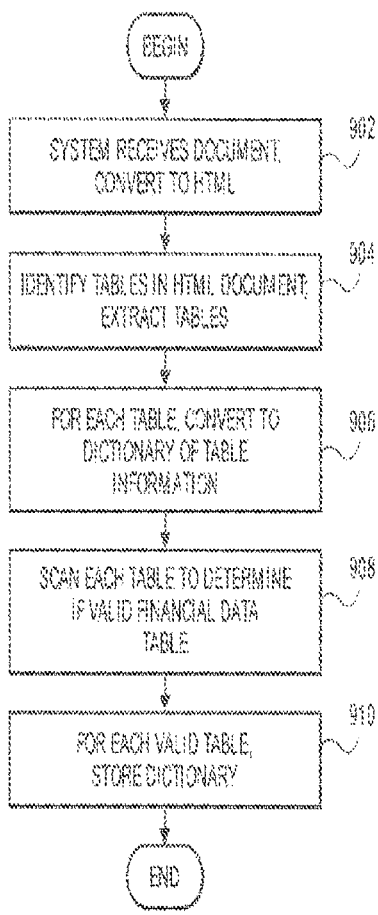
FIG. 9 is a flow diagram of a process of pre-processing a document and creating dictionaries for tables in the document.

Methods and systems for gathering intelligence and understanding financial documents are described in the figures below. FIG. 9 is a flow diagram of a process of pre-processing a document and creating dictionaries for tables in the document. At step 902 the system receives a file of some type of document. The file can come from one of a wide range of sources and may not necessarily be a financial document. For example, it can be a PDF, a PowerPoint document, user notes, an Excel spreadsheet, and so on. In typical cases, the document is some type of financial document such as a 10-K, 10-Q, an annual report, or some other type of conventional financial document for a public company, but may not be.

The general goal is to extract financial data formatted as tables from a corpus of documents containing unstructured data. The system is a computing system that executes software provided and managed by a third-party financial intelligence service provider. The document is inputted, in most cases, by a client of the service provider. After the file is entered, the first operation by the system is converting it to a suitable format for further processing. In one embodiment, the format is HTML. In other embodiments, different formats can be utilized.

At step 904 the system identities tables in the document and extracts them, it separates the tables from the rest of the non-table (or non-tabular) data. This is done by a parsing engine in the system and, in one embodiment, may be implemented by searching for specific tags, such as "TABLE". In other implementations, the parsing engine may search unstructured text for keywords associated with financial data. Some of the tables may not contain financial data or numerical data, in other words, they may not be financial tables. For example, a table may contain only text data, such as names, locations, product names, and so on. However, at step 904, in one embodiment, these tables are still extracted. In addition, the parsing engine is also able to identify and include footnotes. These footnotes may be structurally part of the table or contiguous to the table. The parsing engine is also capable of identifying and processing multi-columnar tables, rendering complex latitudinal (wide) data structures into simplified longitudinal (long) data structures which may be more easily stored and manipulated programmatically.

At step 906, the system converts each extracted table to what is referred to as a dictionary of table information. In one embodiment, the dictionary includes table data values, number of columns, headers, source document location, relationships between data and column headers (e.g., from which column did the data in this row come from), and other data. A sample of a dictionary is "docid": "123abc", "currency": USD, "section;" "Calculation of Net Leverage Ratio", "period:" "Q1, 2017", value: 18890, field: calculation of net leverage ratiototal debt, alias: "net_leverage_ratio: calculation . . . " subsection, table: Net Leverage Ratio, tickler: amt, unit: null.

Step 906 is done for each table extracted from the source document. Once all the tables have been converted to dictionaries, the system scans or examines each table, more specifically, the dictionary for each table, to determine if it contains valid financial data at step 908. For example, the system may look for null values or all text data, examples of two indicators that the table does not contain financial data, the only data relevant to embodiments of the present invention. In one embodiment, the system uses what is referred to as identification logic to spot valid financial tables. For example, it can look for specific financial terms that are commonly used, for instance, as column headers, or look for actual numerical data. This is done for each dictionary created at step 906.

At step 910, the system stores the dictionary for each valid financial data table. The other dictionaries and tables are discarded. The dictionaries and financial tables are written to a central database. From the database, the tables may eventually be displayed in the user interface of the system. For example, a valid financial data table from the source document can be displayed to the user. As described below in FIG. 10, if there is a history of tables that are similar to the table selected by the user, a stitched time series of these similar tables with the selected table may be displayed to the user. One version of the user interface of the system also simply displays the previous tables side by side next to the source table thereby enabling rapid, paginated review. The first stage of the document pre-processing stage is complete after step 910.

Figure 10:
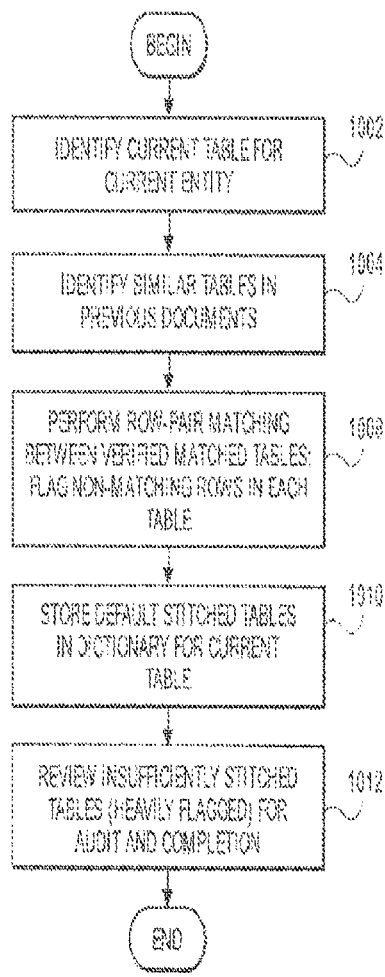
FIG. 10 is a flow diagram of a process of creating a time series of tables in accordance with one embodiment.

FIG. 10 is a flow diagram of a process of creating a time series of tables for a selected table in accordance with one embodiment. As noted, this may also be referred as stitching a currently selected table with similar tables from previously submitted documents from the user. At step 1002 the system begins by identifying a current table (i.e., a table selected by the user) for a current entity. The dictionary for the selected table is retrieved from the database. The term "entity" can refer to anything for which the service provider has data; it provides an umbrella context for the table. It can be characterized as the top of a schema for a corpus of documents, where all tables (and other data) are subordinate to the entity. For example, an entity could be a private company, a public company's stock ticker, an institution, such the Federal Reserve Bank, a government agency, and so on. As noted, it can be anything for which table data has been collected and stored.

At step 1004 the system identifies tables from previous documents for that entity that are similar to the current table. The system performs this operation by using data contained in the dictionary for the selected table. In one embodiment, identifying similar tables is performed by looking at table names (e.g., "Balance Sheet") from previous documents, annual reports, for the current entity.

In one embodiment, this may be done by performing a row-based, "next best" matching algorithm. The "next best match" algorithm can be described as matching the list of rows for the currently selected table against the list of rows for all other tables in previous documents. The best match would be the previous tables for which the number of matched rows is closest to the total number of rows of the currently selected table. At this stage, the system has identified and verified tables that are essentially the same as the current table but from older documents (e.g., from last month, last quarter, last fiscal year, etc.).

It may not be the case that 100% of the rows in all the tables match. In some cases, perhaps because of a merger between two companies or an internal accounting methodology update where field names change, there may be more than a few non-matching row pairs. In any of these scenarios, at step 1006, the non-matching rows are flagged and included in the tables: they are not discarded by the system. In one embodiment, the non-matching rows are moved to the bottom of the table and displayed in a different color from the matching rows. If there is more than a certain ratio of matching to non-matching rows or there is over a pre-determined percentage of non-matching rows, the tables are flagged or marked for manual review, described in step 1010 below.

The operation performed by the system in step 1006 creates a multi-table, row-matched schema for the current table. As noted, this may also be described as a stitched time series of tables for the current table. At step 1008 the row mapping, or stitched table, schema is stored in a database as the default stitching schema for that table. Subsequent user modifications may create a new schema associated with a specific user identifier. As mentioned, the user can modify the default schema by moving non-matching flagged rows back to their original place in the table, requesting that the system merge the flagged row with the non-flagged rows, moving them to wherever they want them to be in the table (e.g., at the top), or can discard them.)

As noted, at step 1008 the system-created, default stitched tables are stored in the dictionary of the current table. Both user-defined and system schemas can be configured for alerts so that when a new table is released that matches the saved schema, the new data is automatically added to the stored stitched tables and the user is notified of the addition.

At step 1010 the service provider via the platform addresses or manually modifies the schema of tables that were marked or somehow distinguished as being heavily flagged tables, tables that have over a pre-determined percentage of flagged rows. A table can also be brought to the attention of the service provider by the user; the user may have a reason or simply want to service provider to audit the table. The tables that are flagged earlier as having too many non-matching rows are still stitched, but may be characterized as insufficiently stitched tables. As such, they are manually reviewed or audited by the service provider who has advanced tools and user interfaces for doing so. During the audit, corrections and updates are made and the insufficiently stitched tables are completed and made into an acceptable time series and stored with the current table in the database and can be displayed or exported, as described below.

Figure 11:
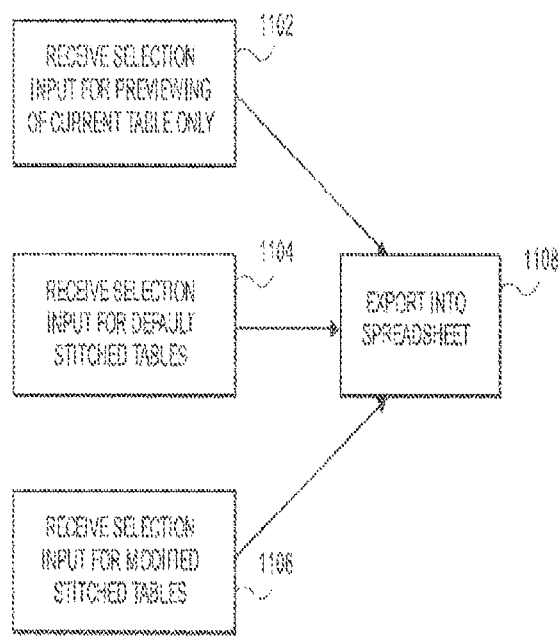
FIG. 11 is a flow diagram showing options of what can be viewed through the platform user interface and exported into a spreadsheet in accordance with one embodiment.

Once the pre-processing and time series creation are complete, the user has options with regard to what can be viewed through the platform's user interface and exported into a spreadsheet. These options are shown in FIG. 11. One option is that the user can elect to see only the current table on the screen. This is shown in box 1102. The user can then export the current table to an external document, such as a spreadsheet at box 1108. This is the table that was selected by the user at the beginning of FIG. 9 and is the table without any stitched tables. Another option is the user can click through to each cell of the time series and stitched tables and have the source table load up in a popup or a window so that the values of the time series can be audited. Another option is the user can apply filters to the values of the time series and stitched tables to handle instances where a reported number is a year to date number and must be adjusted to match the quarter. A table stitching engine, described below, may determine this in many cases by using an algorithm that uses document type and table headers. The system also provides filters that allow year over year values to be added within the table.

At step 1104 the system receives selection input for displaying the default stitched tables as described in FIG. 10. As noted, the default current table may have flagged (unmatched) rows at the bottom of the table (or wherever the system designer decides the default location should be) and may be shown in a different color. The default table is shown with its time series of similar tables. The default current table and the stitched tables can be exported into an external spreadsheet, again as shown in step 1108. As described above, the user can modify the default table, for example, by moving the flagged rows to a different location in the table or deleting them. This modified table and the stitched tables can be selected by the user and the system will display the modified table at step 1106. These tables can also be exported into a spreadsheet and utilized by the user outside of the system. In one embodiment, the dictionary for the table, whether the original (step 1102), default stitched (1104) or modified (1106), is used to display the tabulated data and export into an external document.

Figure 12:
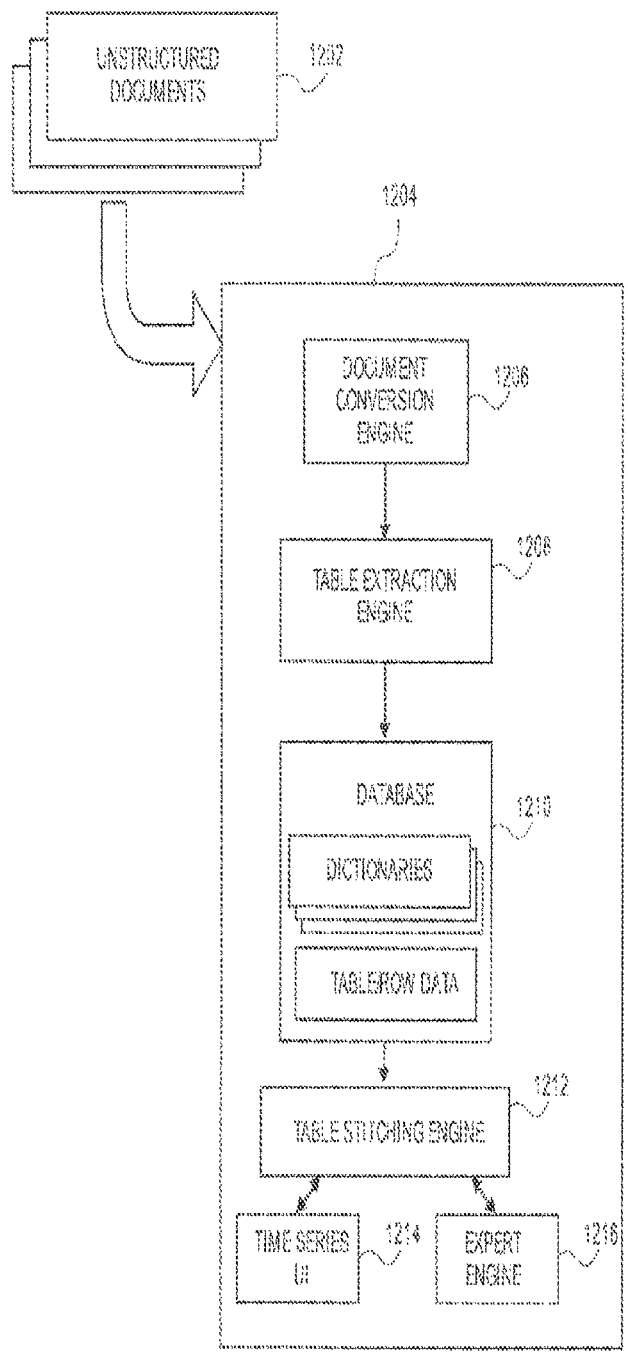
FIG. 12 is a block diagram of a system of the financial document intelligence platform in accordance with various embodiments.

FIG. 12 is a block diagram of a system of the financial document intelligence platform in accordance with various embodiments. The platform may be implemented as software executing on a user (e.g., a customer of the financial document intelligence service provider) system or may be operated by the service provider and offered as a service to users. In either case, the platform has various components, modules, and databases most of which have been referenced above and whose functionality has been shown in the flow diagrams.

A corpus of documents 1202 is inputted into a system or platform 1204. The documents are input one by one and the flow diagrams above explain the steps taken when one document is inputted, such as at step 902, and when one table is selected, as in step 1002. However, a customer is likely to have inputted numerous documents over a period of time. As described above, the only way to obtain a stitched time series of tables is for a user to input numerous documents over time, that is, to have a history of similar documents in the system.

In financial document intelligence system 1204, a document is received by a document conversion engine 1206. This module converts the document, which may be any type of document and may not even be a financial document and have no tables in it, to HTML. A table extraction engine 1208 identifies and pulls any financial tables from the document. In one embodiment, module 1208 is also responsible for converting each table to a dictionary. As described above, several pre-processing steps occur to ensure that only the dictionaries of valid financial tables are converted to dictionaries.

Component 1210 is a database used by system 1204 to store all data needed for creating stitched tables. It stores, among other types of data, dictionaries of tables, user data, and table and row data. A table stitching engine 1212 creates the stitched tables. It takes a current table for an entity and, if historical data is available for that table and entity, creates the stitched tables. Engine 1212 performs many of the steps in FIG. 10, such as identifying and verifying historical tables that are similar in type and schema to the current table. This logic is referred to as identification logic above. It also performs the operations of the row-by-row matching between all the verified similar tables, flagging of non-matching rows, and creating the time series. It executes the row-matching algorithm. Once the table stitching is complete, data for the current table is stored in the table dictionary and stored in database 1210.

Engine 1212 is in communication with a timeseries user interface module 1214 where the user can display various versions of the current table as described in FIG. 11. The user can preview the current table, the default stitched tables, or the modified stitched tables. An export engine module 1216 is used to export tables to a spreadsheet for the user if the export feature is selected.

Figure 13:
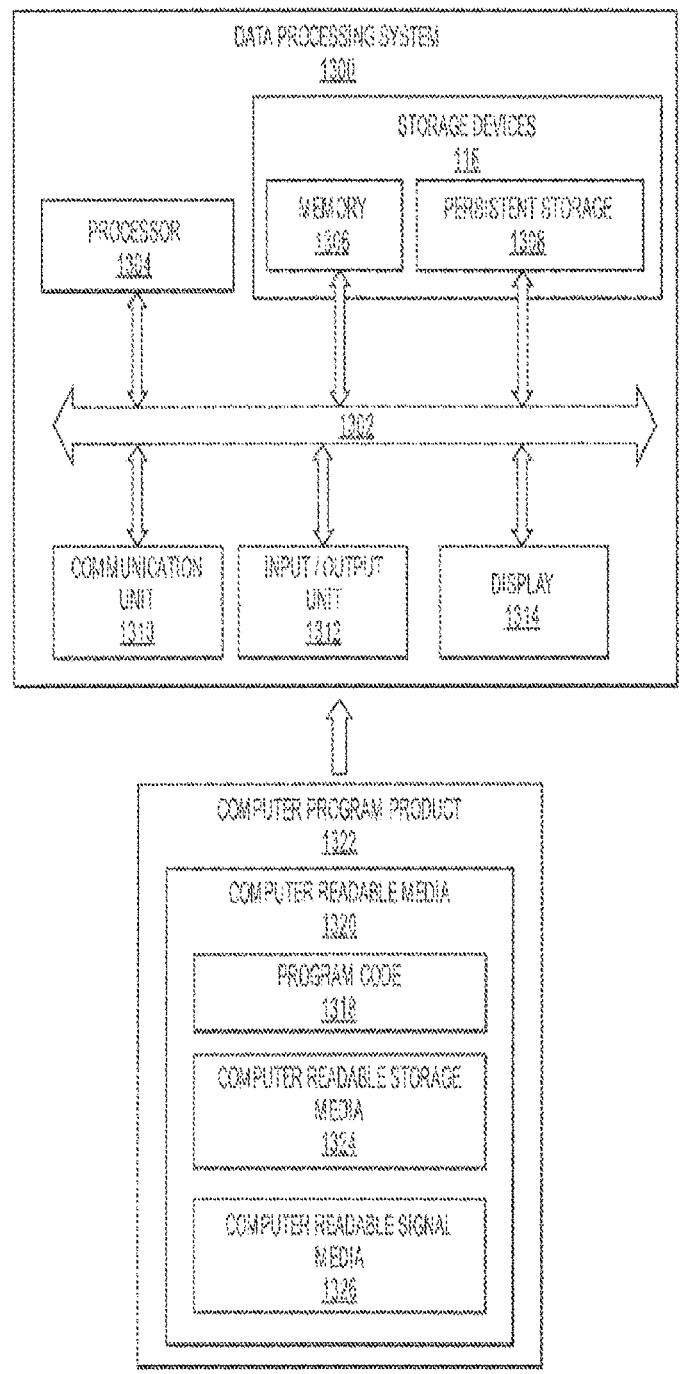
FIG. 13 is a block diagram illustrating an example of a computer system capable of implementing various processes in the described embodiments.

FIG. 13 is an illustration of a data processing system 1300 depicted in accordance with some embodiments and as shown in FIG. 12. Data processing system 1300 may be used to implement one or more computers used in a controller or other components of various systems described above. In some embodiments, data processing system 1300 includes communications framework 1302, which provides communications between processor unit 1304, memory 1306, persistent storage 1308, communications unit 1310, input/output (I/O) unit 1312, and display 1314. In this example, communications framework 1302 may take the form of a bus system.

Processor unit 1304 serves to execute instructions for software that may be loaded into memory 1306. Processor unit 1304 may be a number of processors, a multi-processor core, or some other type of processor, depending on the particular implementation.

Memory 1306 and persistent storage 1308 are examples of storage devices 1316. A storage device is any piece of hardware that is capable of storing information, such as, for example, without limitation, data, program code in functional form, and/or other suitable information either on a temporary basis and/or a permanent basis. Storage devices 1316 may also be referred to as computer readable storage devices in these illustrative examples. Memory 1306, in these examples, may be, for example, a random access memory or any other suitable volatile or non-volatile storage device. Persistent storage 1308 may take various forms, depending on the particular implementation. For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through a keyboard, a mouse, and/or some other suitable input device. Further, input/output unit 1312 may send output to a printer. Display 1314 provides a mechanism to display information to a user.

Instructions for the operating system, applications, and/or programs may be located in storage devices 1316, which are in communication with processor unit 1304 through communications framework 1302. The processes of the different embodiments may be performed by processor unit 1304 using computer-implemented instructions, which may be located in a memory, such as memory 1306.

These instructions are referred to as program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transmitted to data processing system 1300 for execution by processor unit 1304. Program code 1318 and computer readable media 1320 form computer program product 1322 in these illustrative examples. In one example, computer readable media 1320 may be computer readable storage media 1324 or computer readable signal media 1326.

In these illustrative examples, computer readable storage media 1324 is a physical or tangible storage device used to store program code 1318 rather than a medium that propagates or transmits program code 1318.

Alternatively, program code 1318 may be transmitted to data processing system 1300 using computer readable signal media 1326. Computer readable signal media 1326 may be, for example, a propagated data signal containing program code 1318. For example, computer readable signal media 1326 may be an electromagnetic signal, an optical signal, and/or any other suitable type of signal. These signals may be transmitted over communications channels, such as wireless communications channels, optical fiber cable, coaxial cable, a wire, and/or any other suitable type of communications channel.

The different components illustrated for data processing system 1300 are not meant to provide architectural limitations to the manner in which different embodiments may be implemented. The different illustrative embodiments may be implemented in a data processing system including components in addition to and/or in place of those illustrated for data processing system 1300. Other components shown in FIG. 13 can be varied from the illustrative examples shown. The different embodiments may be implemented using any hardware device or system capable of running program code 1318.

Therefore, the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A system comprising:
   at least one processor, the at least one processor configured for:
   receiving a first document and a second document, wherein the first document and the second document each contain tabular data;
   identifying a table from the first received document, wherein the identified table from the first received document contains financial data;
   creating a mapping of data values in the identified table from the first received document to terms associated with rows in the identified table from the first received document and data headers associated with columns in the identified table from the first received document;
   identifying a table from the second received document that contains financial data that is similar to financial data in the identified table from the first received document;

generating a new table that combines the financial data in the identified table from the first received document with the financial data in the identified table from the second received document based on the mapping of data values in the identified table from the first received document;

causing the new table to be displayed on a user interface of a computing device associated with a user of the system; and in response to a selection by the user of the system, exporting the new table in an output document that has a standardized file type to a computing device associated with the user of the system for use outside of the system.

2. The system of claim 1, wherein the financial data in the identified table from the first received document is combined in the new table with the financial data in the identified table from the second received document based on the terms associated with rows in the identified table from the first received document.

3. The system of claim 1, wherein the financial data in the identified table from the first received document is combined in the new table with the financial data in the identified table from the second received document based on the data headers associated with columns in the identified table from the first received document.

4. The system of claim 1, wherein the financial data in the identified table from the first received document is interleaved in the new table with the financial data in the identified table from the second received document such that each row in the new table is organized in chronological order.

5. The system of claim 1, wherein identifying the table from the second received document is performed using row matching or column matching.

6. The system of claim 1, wherein the second received document is a later version or an earlier version of the first received document.

7. The system of claim 1, wherein similarity between financial data in the identified table from the first received document and financial data in the identified table from the second received document is determined based on terms associated with rows in the identified table from the first received document.

8. The system of claim 1, wherein the identified table from the second received document is identified using row-based matching.

9. The system of claim 1, wherein the identified table from the second received document is identified based on data headers associated with columns.

10. The system of claim 1, wherein the identified table from the second received document is identified using statistical comparison between financial data in the identified table from the first received document and financial data in the identified table from the second received document.

11. The system of claim 1, wherein the identified table from the second received document is identified using a dictionary of the identified table from the first received document, wherein the dictionary of the identified table from the first received document includes data values from the identified table from the first received document, number of columns of the identified table from the first received document, the data headers from the identified table from the first received document, a source location of the first received document, or a relationship between data and column headers of the identified table from the first received document.

12. The system of claim 1, wherein the at least one processor is further configured for:

receiving a third document, wherein the third document contains tabular data;

identifying an additional table from the third received document, wherein the additional identified table from the third received document contains financial data that is similar to financial data in the identified table from the first received document and financial data in the identified table from the second received document; and combining, in the new table, the financial data from the additional identified table from the third received document with the financial data in the identified table from the first received document and the financial data in the identified table from the second received document based on the mapping of data values in the identified table from the first received document.

13. The system of claim 12, wherein the at least one processor is further configured for displaying the identified table from the second received document or the additional identified table from the third received document in response to a user selection of a portion of the identified table from the first received document.

14. The system of claim 1, wherein the at least one processor is further configured for generating a user alert when a new document that contains financial data that is similar to financial data in the identified table from the first received document is received by the system.

15. The system of claim 1, wherein the at least one processor is further configured for identifying non-matching rows between the identified table from the first received document and the identified table from the second received document.

16. The system of claim 1, wherein the at least one processor is further configured for displaying the second received document along with the identified table from the second received document.

17. The system of claim 1, wherein the at least one processor is further configured for converting display units in the identified table from the first received document or the identified table from the second received document for consistency.

18. A method comprising:

receiving a first document and a second document, wherein the first document and the second document each contain tabular data;

identifying a table from the first received document, wherein the identified table from the first received document contains financial data;

creating a mapping of data values in the identified table from the first received document to terms associated with rows in the identified table from the first received document and data headers associated with columns in the identified table from the first received document;

identifying a table from the second received document that contains financial data that is similar to financial data in the identified table from the first received document;

generating a new table that combines the financial data in the identified table from the first received document with the financial data in the identified table from the second received document based on the mapping of data values in the identified table from the first received document;

causing the new table to be displayed on a user interface of a computing device associated with a user; and in response to a selection by the user, exporting the new table in an output document that has a standardized file type to the computing device associated with the user.

\* \* \* \* \*